United States Patent [19]

Cronin et al.

[11] 4,434,624
[45] Mar. 6, 1984

[54] ENERGY-EFFICIENT ALL-ELECTRIC ECS FOR AIRCRAFT

[75] Inventors: Michael J. Cronin, Sherman Oaks; Gordon Seid, Los Angeles, both of Calif.

[73] Assignee: Lockheed Corporation, Burbank, Calif.

[21] Appl. No.: 248,603

[22] Filed: Mar. 27, 1981

[51] Int. Cl.³ .............................................. F28B 9/00
[52] U.S. Cl. ...................................... 62/172; 62/402; 62/434
[58] Field of Search ................. 62/172, 401, 402, 434, 62/86, 87

[56] References Cited

U.S. PATENT DOCUMENTS

| | | | |
|---|---|---|---|
| 2,451,280 | 10/1948 | Del Mar | 257/3 |
| 2,452,704 | 11/1948 | Wahlmark | 98/1.5 |
| 2,585,570 | 2/1952 | Messinger | 62/137 |
| 2,614,815 | 10/1952 | Marchant | 257/9 |
| 2,678,542 | 5/1954 | Stanton | 62/6 |
| 2,697,917 | 12/1954 | Mayer | 62/6 |
| 3,234,738 | 2/1966 | Cook | 62/402 |
| 4,263,786 | 4/1981 | Eng | 62/402 |
| 4,283,924 | 8/1981 | Schutze | 62/402 |

Primary Examiner—Ronald C. Capossela
Attorney, Agent, or Firm—Louis L. Dachs

[57] ABSTRACT

The invention is an energy-efficient all-electric environmental control system (70). The system includes a cabin compressor (16) and a Freon compressor (14), both of which are commonly driven by a two-speed electric motor (12). The motor (12) operates at low speed at low altitudes and on the ground to drive the Freon compressor (14). Freon fluid then cools the electric motor (12) and the cabin (18) and avionics (56) by means of the evaporator dehumidifier systems (72) and (74), respectively. At high altitudes the electric motor (12) runs at high speed to drive the cabin compressor (16) to provide pressurization for the cabin (18). In this operation mode, the Freon compressor can be disconnected via an electromagnetic clutch (48).

The ECS (70) also includes a liquid Freon pump (52) which can be utilized when the Freon compressor is disconnected or bypassed to circulate liquid Freon to cool the electric motor (12) and to circulate through the evaporators (38) and (76). The pump (52) is driven by an ac or dc motor (54).

34 Claims, 3 Drawing Figures

1

ENERGY-EFFICIENT ALL-ELECTRIC ECS FOR AIRCRAFT

TECHNICAL FIELD

The invention relates generally to environmental control systems (ECS's), and more particularly to an all-electric air-conditioning system for aircraft cabin pressurization and cooling.

BACKGROUND ART

In most prior art aircraft ECS's, mid and last stage bleed-air ports are provided on the engine compressor for provision of bleed air, or cabin compressors are driven mechanically by engine gear boxes. In the increasing drive to achieve energy-efficient engines, bleeding the engine compressors airflow impacts unfavorably upon the thermodynamic cycle of the engine and results in it being a very inefficient method of power extraction. This problem is further exacerbated by the trend toward high compression ratio engines. In contrast, the extraction of mechanical power has much less impact upon the thrust losses and upon the specific fuel consumption (SFC) of the new and advanced technology engines. Examples of aircraft air-conditioning and ECS's utilizing aircraft engine driven compressors can be found in U.S. Pat. Nos. 2,451,280 to Del Mar, 2,452,704 to Wahlmark, 2,585,570 to Messinger et al, 2,614,815 to Marchant et al, 2,678,542 to Stanton and 2,697,917 to Mayer.

Some of the problems often associated with prior art bleed air ECS's are: (1) the engine is subject to thrust loss and SFC penalties by bleeding the compressor; (2) pressurized (high temperature) air ducts must be routed up through the pylons and through the wings into the cabin. (3) failures of ducts can occur; (4) air ducts must be disconnected for engine removals; and (5) cross-bleed-ducts are necessary to permit engine "cross-starts". On the other hand, mechanical compressors are: (1) bulky, noisy and create space problems around the accessory gear boxes; (2) inlet ducts and pressure ducts crowd the engine cowl; (3) mechanical compressors are high speed and require disconnect couplings; and (4) reliability is not good.

Electro-mechanical systems for extracting ECS power from aircraft engines offer yet another alternative. Such systems are disclosed in copending U.S. patent applications Ser. No. 183,499, filed Sept. 2, 1980, for "ECS Energy Recovery System For Fuel-Efficient Aircraft", Ser. No. 183,609, filed Sept. 2, 1980, for "All Electric Environmental Control System For Advanced Transport Aircraft", and Ser. No. 183,079, filed Sept. 2, 1979, for "Direct-Driven Generator System for Environmental Control System and Engine Starting", all assigned to the assignee herein. All of the aforementioned applications, the disclosures of which are incorporated by reference herein, disclose ECS embodiments which include a compressor driven by an electric motor which derives its power from an engine-driven generator.

The aforementioned prior art patents and copending applications, incorporated herein by reference, all disclose systems which, to varying degrees of efficiency, carry out certain aircraft ECS and air-conditioning system functions. While the aforementioned copending applications disclose certain relatively high efficiency approaches to providing aircraft environmental control, it is nevertheless, an ongoing goal that ECS and air-conditioning systems be optimized in terms of efficiency in view of the present day strong need for fuel-efficient air transports. It is essential, then, that the energy and fuel consumption in extracting power for aircraft ECS's and air-conditioning systems be optimized (minimized).

Thus, it is a primary object of this invention to provide a method and system for optimizing aircraft ECS's in terms of energy, and thus, fuel consumption.

It is another object of this invention to provide an energy-efficient ECS system for aircraft which optimized the aircraft's fuel efficiency while providing conditioned air by extracting power from the aircraft's engines electromechanically.

It is another object of the present invention to provide an ECS and air-conditioning system which efficiently extracts power electro-mechanically from an aircraft's engines while utilizing a single motor to drive two optimally designed compressors, a Freon compressor for air-conditioning and a cabin compressor for cabin air supply and pressurization needs.

DISCLOSURE OF INVENTION

The invention comprises the provision of an aircraft ECS which utilizes a cabin compressor and a Freon compressor both driven by a common two-speed electric motor which derives electric power from aircraft engine generators. When the aircraft requires maximum cooling, the electric motor runs at half speed and the Freon compressor is operated at its optimum output rating. When maximum aircraft cabin pressurization must be met, the Freon compressor is off-loaded, the motor is run at full speed and the cabin compressor is then operated at its optimum output rating to meet cabin pressurization needs. By utilization of the two operating speeds of the two speed motor and off-loading of the compressors, by either disconnect, bypass, or inlet guide vane control means, the overall ECS operates efficiently during all modes of the aircraft flight envelope.

The ECS also includes a liquid Freon pump which can circulate liquid Freon to cool the two speed motor aircraft avionics and other aircraft sub-systems when the Freon compressor is not being run.

The novel features which are believed to be characteristic of the invention, both as to its organization and its method of operation, together with further objects and advantages thereof, will be better understood from the following description, taken in connection with the accompanying drawings in which a presently preferred embodiment of the invention is illustrated by way of example. It is to be expressly understood, however, that the drawings are for purposes of illustration and description only, and are not intended as a definition of the limits of the invention.

BRIEF DESCRIPTION OF DRAWINGS

Referring to FIG. 1, the energy-efficient optimally designed ECS (10) of the present invention is shown utilizing a common two-speed electric motor (12) to drive two compressors; a Freon compressor (14) and a cabin compressor (16). The electric motor (12) is shown as a three-phase squirrel-cage induction motor, operable with power that ranges from 3 phase 200 V 400 Hz to 3 phase 400 V 800 Hz, but it should be appreciated that other motors, such as a 270 VDC motor could be utilized.

One of the unique features of the motor-compressor arrangement of the present invention lies in the fact that there is a fortuitous balance between the demands for cooling and the demands for cabin pressurization. As an example, the maximum cooling load in an aircraft is on the ground, on a hot day, when there is a maximum passenger complement and a maximum conductive heat load from outside into the cabin. At this time, however, there is no demand for pressurization of the cabin (18). Conversely, at the high cruise altitudes of 30,000 to 40,000 feet, there is a maximum demand for pressurization, but little or no demand for cooling. Thus, there is a synergistic relationship in the demand for cooling and the demand for pressurization. This makes it possible to use a single-drive motor (of given horsepower rating) since the sum of the Freon and cabin compressor demands will remain relatively constant over various segments of the flight envelope. At altitudes of about 8,000 feet, modulation of both the Freon compressor (14) and the cabin compressor (16) would be effective, since there may still be a small demand for cooling and, also, the beginning of a small but positive demand for pressurization.

Figure 1:
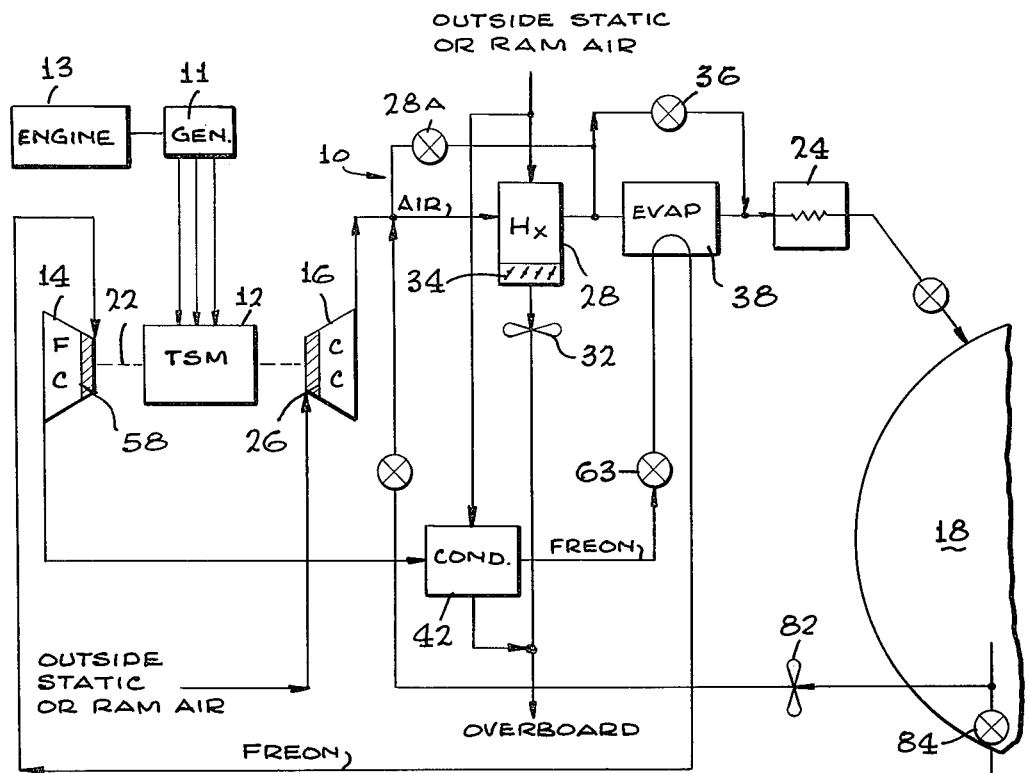
FIG. 1 is a schematic representation of a first embodiment of the energy-efficient all-electric ECS of the present invention.

Returning to FIG. 1, electric motor (12) is shown as a double-ended shaft motor with the Freon compressor (14) at one end of a shaft (22) and the cabin compressor (16) at the other end. In order to minimize weight, a critical commodity in aircraft environments, the motor operates in the range of about 24,000 to 48,000 rpm. The compressor (16) is a dedicated compressor and provides basic pressurized air in flight as well as heating effects via heat of compression. Electric duct heaters (24), which are temperature-modulated by phase angle-controlled SCRs, are also used as an alternative source of heated-air, if the cabin compressor (16) is not running or is off-loaded, as for example under certain ground conditions.

The ECS of the present invention is designed to operate on variable-voltage/variable-frequency aircraft power systems, such as those disclosed in copending U.S. application Ser. No. 173,111, filed July 28, 1980, for "A Direct-Driven Aircraft Generating System Providing Variable and Constant Levels of Electric Power", assigned to the assignee herein and hereby incorporated by reference herein, and the aforementioned copending application U.S. Ser. No. 183,079. Both of these applications are characterized by operation at two nominal-power frequencies. In flight, the aircraft engine generators (11) run at 400 V/800 Hz output power, and on the ground at 200 V/400 Hz. As stated in the '079 application, in the ground logistic support of the airplane and its ECS, 200 V/400 Hz power most probably would be used. It is often during the ground portion of the flight envelope that the aircraft requires maximum cooling.

Under the ECS of the present invention, the Freon compressor (14) is designed for its rated output at about 200 V/400 Hz and it operates at its full capacity when the electric motor (12) is operating at half-speed. At the 400 V/800 Hz condition, the aircraft is in the flight mode of operation and, as discussed hereinabove, maximum air conditioning is probably no longer required. When the aircraft is taking off, climbing and cruising (flight modes of operation), power in the area of 800 Hz is being generated by the engine (13) driven variable voltage/variable frequency generator (11), and to avoid overspeeding the Freon compressor (14), use is made of the pole-changing electric motor (12). By switching the number of poles (doubling them), the electric motor (12) runs at the same speed with 800 Hz power as it was running at 400 Hz (ground mode) with half the number of poles.

Up to about 6,000 feet altitude, the cabin (18) need not be pressurized, consequently the cabin compressor (16) operates at a low pressure-ratio (at half speed). At and about 6,000 feet, the pressurization need begin and, with the motor still at half-speed, the inlet guide vanes (26) on the cabin compressor are modulated to control mass-flow and pressure ratio. At this portion of the flight envelope, the outside atmospheric pressure and air density are still relatively high. As the aircraft altitude increases, a point is reached (typically around 15,000 feet) where the need for higher pressure ratio is met by switching motor (12) from four to two poles and disconnecting the Freon compressor (14) (as for example by utilization of an electromagnetic clutch (48) or other suitable means). By reducing the number of poles to two, with an engine-generator frequency of about 800 Hz, the two-speed electric motor (12) runs at its high speed, i.e. approximately 48,000 rpm. The motor (12) and the cabin compressor (16) now operate in the primary role of furnishing the required supply of pressurized air.

At cruise altitude, for example 35,000 feet or more, the inlet guide vane (26) angles are set to provide the maximum pressure ratio across cabin compressor (16); at which point the electric motor (12) is fully loaded. As the discharge air temperature from the cabin compressor (16) is much higher than required for the cabin (18), it is passed through a heat exchanger (28) which is adapted to receive ram-air (or static air) on the ground, via a fan (32). The heat exchanger (28) is additionally provided with cooler-shutters (34) and a bypass valve (28A), which can control the amount of heat reduction effected through the heat exchanger (28). At this time, cabin temperature control would modulate bypass valve (36) to allow the air to bypass the Freon-evaporator (38).

During ground operation of the Freon cooling system, the heat-sink is the outside air which is passed through the condenser (42). Thus, on the ground and at low altitudes, heat exchanger (28) acts as a pre-cooler for cabin air prior to its being passed through the evaporator (38) for further cooling. Heater (24) is of course not required at this time since it is only needed for cold days and at high-altitude operation with low passenger complement (low metabolic heat-load).

Figure 2:
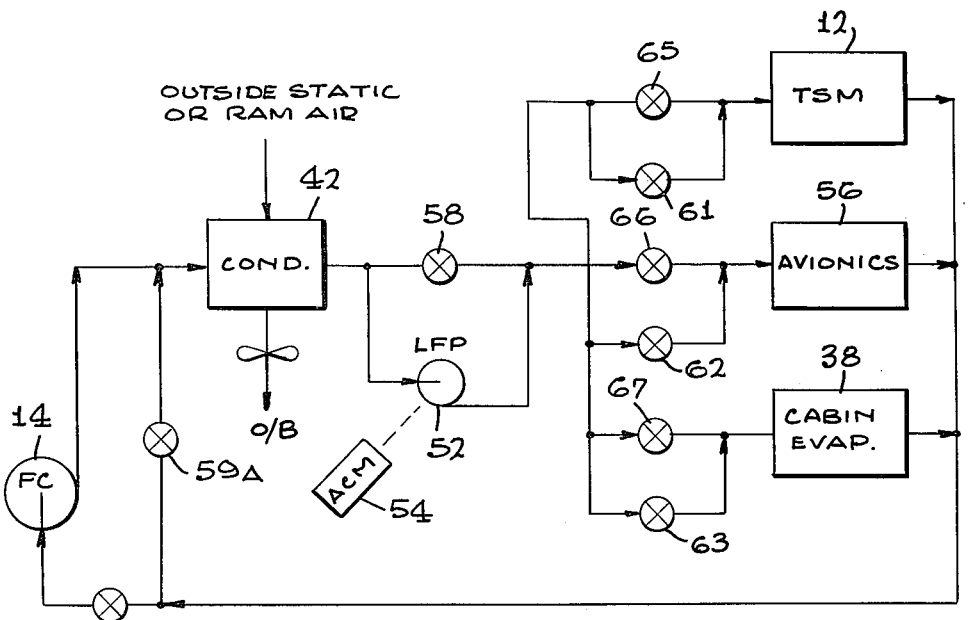
FIG. 2 is a schematic representation of a Freon cooling circuit portion of the energy-efficient all-electric ECS of the present invention.

Referring now to FIG. 2, there is shown therein a modified Freon cooling circuit in accordance with another embodiment of the present invention. This cooling circuit includes the Freon compressor (14) and the condenser (42), but additionally includes a separate motor-driven liquid Freon pump (52). The pump (52) is driven by an ac (or dc) electric motor (54) which may be supplied with 400 Hz power from ground support or the aircraft's auxiliary power unit.

When the Freon compressor (14) is inoperative, as for example at high altitudes or on the ground at normal temperatures when there is no heavy cooling load, it might still be desirable to cool certain other aircraft subsystems, such as the avionics (56), the two-speed electric motor (12), and to operate the evaporator (38) as an air-to-liquid heat exchanger. Under these relatively light cooling conditions, bypass valve (58) is closed and bypass valves (59), (61), (62), and (63), are open. Liquid cooling is thus provided for the electric motor (12), the avionics (56), and the cabin evaporator (38). With this arrangement, the liquid Freon is circulated to absorb the heat from the aforementioned loads, after which it passes through the condenser (heat-exchanger) (42) back to the pump (52) inlet.

When a maximum cooling demand arises, the full air-conditioning system can be activated by switching on the Freon compressor (14), closing the bypass valves (59), (61), (62), and (63), opening the bypass valve (58), and shutting off the ac motor (54). When the cooling system is thus operating under this maximum condition, the inlet guide vanes (58) on compressor (14) are set to control the appropriate Freon flow. At this time, the expansion valves (65), (66), and (67) operate as in typical known vapor cycle cooling systems.

Figure 3:
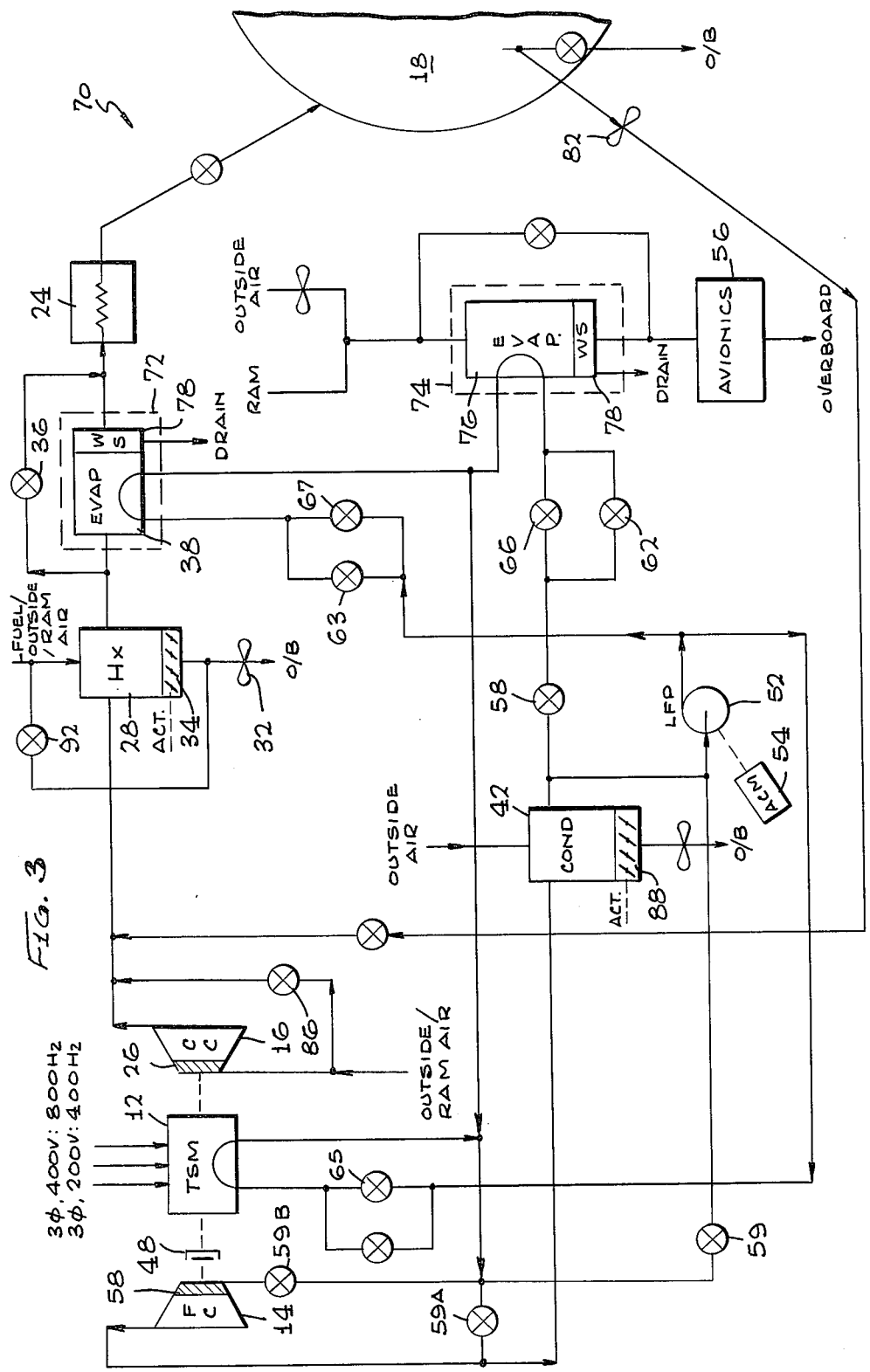
FIG. 3 is a schematic representation of a second embodiment of the energy-efficient all-electric ECS of the present invention. In all drawing Figures, like numerals denote like parts.

A more detailed embodiment of an overall energy efficient ECS (70) in accordance with the present invention is shown in FIG. 3. The ECS (70) includes the basic pressurization and air-conditioning/cooling elements discussed hereinabove with respect to FIGS. 1 and 2. In addition, evaporator/dehumidifier systems (72) and (74) are shown for cooling, and removing water from the air, during operation in conditions of high humidity. The condensed air-entrained moisture entering water separator (78) is then dumped overboard via a suitable water drain.

The following chart indicates the interaction and operative modes of the aircraft engine (13), variable-voltage/variable-frequency generator (11), two-speed motor (12), Freon compressor (14), cabin compressor (16) and liquid Freon pump (52) during various portions of a typical flight envelope for an aircraft having approximately a full complement of passengers.

(16) will supply the full cabin (18) air mass flow (less any cabin air recirculation via a recirculation-fan (82)); and cabin pressure will be regulated to a desired altitude, for example 6,000 feet, by the operation of an outflow valve (84).

During the idle descent letdown, from about 35,000 feet for example, when engine speeds will drop to about 80%, the motor (12) will also drop to about 80%, resulting in a closure of the outflow valve (84). The cabin compressor (16) will now operate at reduced pressure ratio and the cabin pressure (depending on uncontrolled leakage), will tend to increase to an 80,000 foot pressure altitude. As the aircraft loses altitude, the air density and the atmospheric pressure also increases, resulting in a return to modulation of the outflow valve (84).

During static ground operation, standard hot day 103° F. (and a full passenger complement), the Freon compressor (14) will be on full load with Freon circulating through the condenser (42) and evaporator (38). During this period, cabin compressor (16) will be unloaded via the inlet guide vane control (26) by opening the compressor bypass valve (86). On static normal temperature days with light cooling-loads, the inlet guide vanes on the Freon compressor (14) will be modulated and the cooling air flow through the condenser (42) will be controlled (by the cooler shutter doors) (88), to maintain an approximately constant condensing pressure. Some Freon may also be bypassed from the condenser outlet to the inlet of Freon compressor (14) (via the Freon bypass valve (59)), where it may be mixed with hot Freon gas, bypassed via the bypass valve (59A). This Freon/vapor mixture would pass through the anti-surge valve (59B), which will prevent possibilities of compressor surge at low Freon rates.

For a maximum complement of passengers, the Freon compressor (14) and the Freon inlet guide vanes (58) operate to control the Freon flow at or near maximum levels. If the passenger metabolic heat load is lower, then inlet guide vanes (58) will modulate to reduce flow. For relatively cool outside air temperatures but with a large metabolic heat load, some cooling could be provided by the liquid Freon pump (52) circuit ON and the Freon compressor (14) OFF. Under this condition,

| Flight Mode | Engine (13) Generator (11) Power output | Cabin (18) Pressure Requirements | Cooling Requirements | Freon Compressor (14) | Cabin Compressor (16) | Liquid Freon Pump (52) | Motor (12) |
|---|---|---|---|---|---|---|---|
| Ground (hot day) | ≈ 200V/400Hz | None or Low | High | Running at rated output | Running at reduced output | OFF | ½ speed (4 poles) |
| Ground (cool day) | 0 | 0 | Low | 0 | 0 | ON | 0 |
| Takeoff or (Landing) | ≈ 400V/800Hz | None or Low | Low or High | Running at modulated output | Running at reduced output | OFF | ½ speed (4 poles) |
| Climbing 0 to ≈ 15,000 ft. or (Descent) | ≈ 400V/800Hz | increasing (IGV control) | Low | Running at reduced output (IGV control) | Running at reduced output | OFF | ½ speed (4 poles) |
| Climbing ≈ 15,000 to cruise alt. or (Descent) | ≈ 400V/800Hz | High | Low | OFF | High Speed | OFF | Full speed (2 poles) |
| Cruise altitude | ≈ 400V/800Hz | High | Low | OFF | High Speed | OFF | Full Speed (2 poles) |

Operation of the ECS (70) is as follows. At normal cruise altitudes of about 35,000 to 40,000 feet (and at normal engine speeds of about 92%) cabin compressor the ac motor (54) drives the liquid Freon pump (52) and circulates the Freon through the evaporators (76) and (38), and the electric motor (12). This circulation will occur with bypass valves (62), (63), (61), and (59A) open.

On cold day ground conditions (with low, or moderate, metabolic load) some cabin heating may be required and this can be accomplished by circulating the cabin air flow through the electric heater(s) (24); temperature modulation of these heaters can be accomplished with phase-controlled SCRs. During high altitude conditions, the motor (12) and cabin compressor (14) will be operating and advantage can be taken of the heat of compression with the air temperature being modulated by the temperature control valve (92) or (28A), FIG. 1. This valve functions to control the amount of heat exchanger (28) bypass. The heat exchanger (28) during this mode of operation may utilize outside air cooling or aircraft fuel. To avoid the inlet momentum loss associated with bringing ram-air onboard (for the heat exchangers), air-to-fuel heat-exchangers could be used, as another energy-efficient measure. Similiarly, while the condenser (42) is shown to utilize outside air cooling, it also could use fuel-cooling. The utilization of fuel as a heat sink, however, would be constrained by the limits of the bulk-fuel temperature, as it might exist towards the end of a flight. On takeoff and during a climb to about 6,000 feet, on a hot day, Freon compressor (14) operates at full high load, if there is a maximum complement of passengers. At this time, the cabin compressor (16) is fully off-loaded, or is operating at very low pressure-ratio because of the fact that it is operating at only 50% of its design speed. Again, any variation and decrease in cooling requirements as the aircraft gains altitude is met by control of the inlet guide vanes (26) on the Freon compressor (14).

As the aircraft gains further altitude, for example in going from about 6,000 feet to about 15,000 feet, the Freon-cooling demand decreases and the pressurization demand increases. Therefore the load on common drive-motor (12) tends to remain fairly constant. During this portion of the flight envelope, pressure and cooling demands are met by operation of the inlet guide vanes (26) and the inlet guide vanes (58). At about 15,000 or some appropriate altitude, the inlet guide vanes (26) of the cabin compressor (16) reach their limit of control so a further increase in altitude requires a change to the two-pole configuration (to increase motor (12) speed to 48,000 rpm).

From about 15,000 feet to cruising altitude of approximately 35,000–40,000 feet, when the cabin compressor is operating at its maximum pressure ratio, the discharge termperature of the air is controlled by outside ram air passing through the heat exchanger (28). Between the 15,000 and 40,000 operation, with the compressor (16) at 100% design speed, inlet guide vanes (26) operate to adjust the pressure ratio as a function of outside air density and atmospheric pressure. During this portion of the flight envelope, on a cold day, heating may be required if the metabolic (passenger) load is low. This heating is derived mainly by heat-of-compression rather than by use of the electric duct heaters.

The energy-efficient all-electric ECS of the present invention offers several distinct advantages in the design and operation of aircraft as follows:

1. The need for engine bleeding is eliminated, resulting in engine simplification and improved specific fuel consumption;
2. Ducts and valves are removed from the engine, wings, and pylons to the improvement of the maintenance/labor aspects of the aircraft;
3. The problems of high bleed air temperature leakage, due to duct failures, are eliminated.
4. Savings in weight are achieved by the elimination of the ducts and the requirement for less fuel;
5. The all-electric ECS permits operation without running engines, or using ground air-conditioning power supplies;
6. Cabin pressurization can be checked for leakage by running the motor-compressors in the aircraft;
7. Cabin compressors can be switched off when not required at low altitudes;
8. Freon packs have a high coefficient of performance;
9. The vapor cycle system provides improved cooling for avionics, etc., on the ground;
10. The ECS eliminates the need for large mechanical-compressors on the auxiliary power unit;
11. The all-electric ECS affords significant control flexibility;
12. Engine installation and removal is facilitated by the absence of ducts;
13. The all-electric ECS is modular in design and highly reliable; and
14. The Freon vapor cycle permits a higher degree of air recirculation than is possible with an air cycle cooling system.

It is apparent that there has been provided with this invention a novel energy-efficient all-electric ECS which fully satisfies the objects, means, and advantages set forth hereinabove. While the invention has been described in combination with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

INDUSTRIAL APPLICATIONS

The energy-efficient all-electric environmental control system of the present invention is useful for installation in aircraft, particularly in advanced transport aircraft, and is adapted to provide pressurized conditioned air to the aircraft cabin.

We claim:

1. An environmental control system for an aircraft having at least one engine, at least one generator driven by said at least one engine, and a cabin, said environmental control system being adapted for providing conditioned air to said cabin, the improvement comprising:
   an air circuit for providing said conditioned air to said cabin;
   an evaporative heat exchanger located within said air circuit;
   a coolant circuit for providing a fluid coolant path through said environmental control system, said coolant circuit coupled to said evaporative heat exchanger;
   a coolant compressor located within said coolant circuit;
   expansion valve means located within said coolant circuit for evaporating said fluid coolant;
   a cabin compressor located within said air circuit;
   electric motor means adapted to be powered by said at least one generator; and
   means associated with said electric motor whereby said motor is adapted to drive both said coolant compressor and said cabin compressor.

2. An environmental control system as in claim 1 wherein said electric motor is a multi-speed motor having at least one low speed and at least one high speed.

3. An environmental control system as in claim 2 wherein said electric motor is operable from a variable-voltage/variable-frequency power-supply.

4. An environmental control system as in claim 2 wherein said electric motor is a 270 volt DC motor.

5. An environmental control system as in any one of claims 2, 3, or 4 wherein said at least one generator generates variable-voltage/variable-frequency power.

6. An environmental control system as in claim 2 wherein said coolant compressor is designed for its rated output at said at least one low speed.

7. An environmental control system as in claim 1 wherein said coolant compressor includes means for modulating the flow of coolant therethrough.

8. An environmental control system as in claim 7 wherein said modulating means comprises a set of inlet guide vanes on said coolant compressor.

9. An environmental control system as in claims 1 or 7 wherein said cabin compressor includes means for modulating the air mass flow and pressure-ratio of said cabin compressor.

10. An environmental control system as in claim 9 wherein said means associated with said electric motor includes means for disconnecting said coolant compressor from said electric motor.

11. An environmental control system as in any one of claims 1 or 2 wherein said means associated with said electric motor comprises a common shaft for turning both said coolant compressor and said cabin compressor.

12. An environmental control system as in claim 1 wherein said conditioned air circuit includes a second-heat exchanger for cooling said conditioned air.

13. An environmental control system as in claim 12 wherein said conditioned air circuit includes means for heating said conditioned air.

14. An environmental control system as in claim 12 including bypass valve means positioned in said fluid coolant circuit on the fluid coolant input side of said evaporative heat exchanger.

15. An environmental control system as in claim 12 wherein said fluid coolant circuit passes through said electric motor to provide vapor or liquid coolint capability respectively.

16. An environmental control system as in any of claims 13, 17, or 15 including a liquid coolant pump located within said fluid coolant circuit for circulating fluid coolant in said coolant circuit when said expansion valve means are closed and said bypass valve means are open.

17. An environmental control system as in claim 1 wherein said fluid coolant circuit passes through said electric motor.

18. An environmental control system as in claim 17 including said expansion valve means and bypass valve means positioned in said fluid coolant circuit on the fluid coolant input side of said electric motor.

19. An environmental control system as in claim 18 including said expansion valve means and bypass valve means positioned in said fluid coolant circuit on the fluid coolant input side of said electric motor.

20. An environmental control system as in claim 19 wherein said means for providing cooling for said avionics comprises a second evaporator heat exchanger.

21. An environmental control system as in claim 20 including second expansion valve means and second bypass valve means positioned in said fluid coolant circuit on the fluid coolant input side of said second evaporator unit.

22. An environmental control system as in claim 21 including an ac or dc motor adapted for driving said liquid coolant pump.

23. An environmental control system as in claim 22 wherein said ac or dc motor is adapted to be powered by ground support, aircraft primary and aircraft auxiliary power sources.

24. An environmental control system as in any one of claims 2 or 23 wherein said cabin compressor is designed for its rated output at said at least one high speed.

25. An environmental control system as in claim 21 wherein said fluid coolant is Freon.

26. An environmental control system as in any one of claims 1, 14, or 18 wherein said aircraft includes avionics, said environmental control system including means for providing cooling for said avionics.

27. An environmental control system as in claim 26 wherein said fluid coolant circuit passes through said second evaporator heat exchanger.

28. An environmental control system as in claim 27 including a liquid coolant pump located within said fluid coolant circuit for circulating fluid coolant in said coolant circuit when said expansion valve means are closed and said bypass valve means are open.

29. An environmental control system as in claim 28 wherein said ac or dc motor is adapted to be powered by ground support, aircraft primary and aircraft auxiliary power sources.

30. An environmental control system as in claim 27 wherein said fluid coolant is Freon.

31. An environmental control system as in claim 1 including means to bypass or disconnect said coolant compressor, said environmental control system further including liquid coolant pump means located within said fluid coolant circuit for circulating fluid coolant when said coolant compressor is disconnected or bypassed.

32. An environmental control system as in claim 31 including an ac or dc motor adapted for driving said liquid coolant pump.

33. An environmental control system as in claim 31 wherein said fluid coolant is Freon.

34. An environmental control system as in any one of claims 1, 13, 17, 15, or 16 wherein said fluid coolant is Freon.

* * * * *